United States Patent
Isoda

[11] Patent Number: 6,048,468
[45] Date of Patent: Apr. 11, 2000

[54] CERIUM ACTIVATED ALKALINE EARTH METAL FLUOROHALIDE PHOSPHOR

[75] Inventor: Yuji Isoda, Kanagawa, Japan

[73] Assignee: Fuji Photo Film, Co., Ltd., Kanagawa, Japan

[21] Appl. No.: 09/281,941

[22] Filed: Mar. 31, 1999

[30] Foreign Application Priority Data

Mar. 31, 1998 [JP] Japan ................................. 10-105569

[51] Int. Cl.[7] ........................... C09K 11/68; H05B 33/00
[52] U.S. Cl. .................................. 252/301.4 H; 250/484.4
[58] Field of Search ........................ 423/301; 250/484.3, 250/484.4; 252/301.4 H

[56] References Cited

U.S. PATENT DOCUMENTS 5,639,400  6/1997  Roberts et al. ................. 252/301.4 H
5,904,995  5/1999  Maezawa et al. ...................... 428/690

*Primary Examiner*—Steven P. Griffin
*Assistant Examiner*—Maribel Medina
*Attorney, Agent, or Firm*—Birch, Stewart, Kolasch & Birch, LLP

[57] ABSTRACT

A cerium activated alkaline earth metal fluorohalide phosphor having the formula (I):

$$M^{II}FBr_{1-x}I_x:aCe, bM^I, cM^{IV}F_4 \quad (I)$$

[$M^{II}$ is Mg, Ca, Sr or Ba; $M^I$ is Li, Na, K, Rb or Cs; $M^{IV}$ is a tetravalent metal element; and x, a, b and c are numbers of $0 \leq x \leq 0.30$, $0.00001 \leq a \leq 0.01$, $0 < b \leq 0.01$ and $0 < c \leq 0.001$] and a radiation image storage panel utilizing the phosphor.

6 Claims, 2 Drawing Sheets

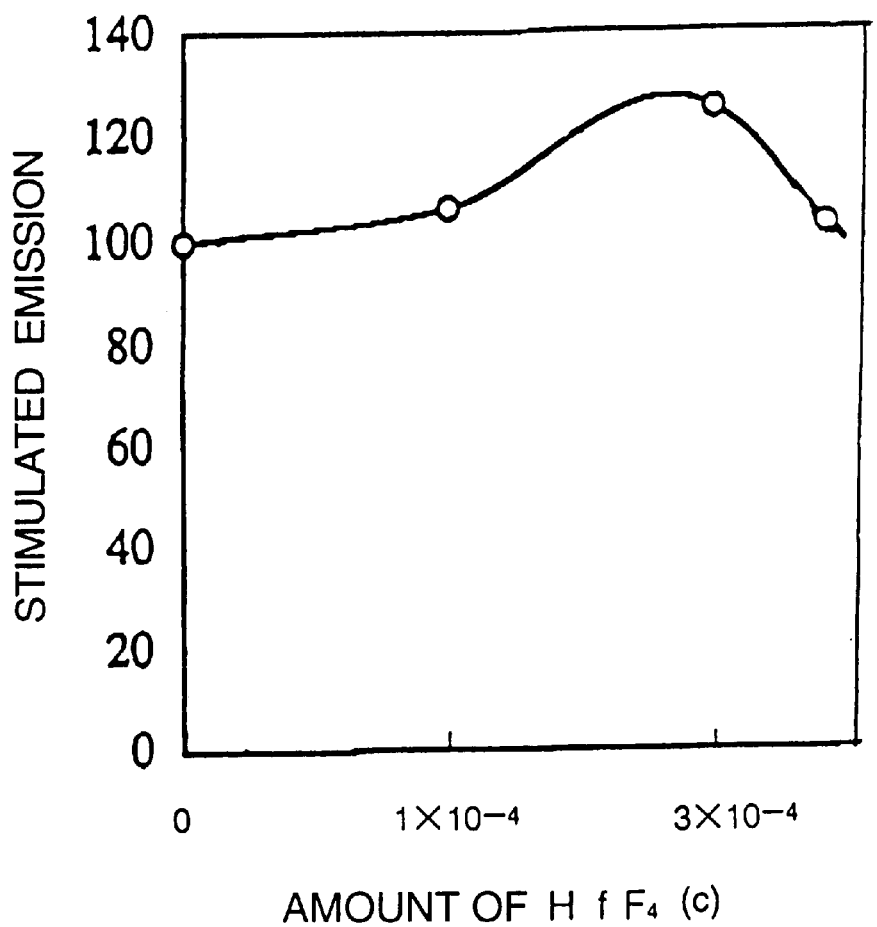

CERIUM ACTIVATED ALKALINE EARTH METAL FLUOROHALIDE PHOSPHOR

FIELD OF THE INVENTION

The present invention relates to a new stimulable cerium activated alkaline earth metal fluorohalide phosphor, and a radiation image storage panel utilizing the phosphor.

BACKGROUND OF THE INVENTION

As a method replacing a conventional radiography, a radiation image recording and reproducing method utilizing a stimulable phosphor was proposed and has been practically employed. The method employs a radiation image storage panel comprising a support and a stimulable phosphor layer (stimulable phosphor sheet) provided thereon, and comprises the steps of causing the stimulable phosphor of the panel to absorb radiation energy having passed through an object or having radiated from an object; sequentially exciting the stimulable phosphor with an electromagnetic wave such as visible light or infrared rays (hereinafter referred to as "stimulating rays") to release the radiation energy stored in the phosphor as light emission (i.e., stimulated emission); photoelectrically detecting the emitted light to obtain electric signals; and reproducing the radiation image of the object as a visible image from the electric signals. The panel thus treated is subjected to a step for erasing a radiation image remaining therein, and then stored for the next recording and reproducing procedure. Thus, the radiation image storage panel can be repeatedly employed.

In the radiation image recording and reproducing method, a radiation image is obtained with a sufficient amount of information by applying a radiation to an object at a considerably smaller dose, as compared with a conventional radiography using a combination of a radiographic film and radiographic intensifying screen. Further, the method is very advantageous from the viewpoints of conservation of resource and economic efficiency because the radiation image storage panel can be repeatedly used while the radiographic film is consumed for each radiographic process in the conventional radiography.

The stimulable phosphor produces stimulated emission when excited with stimulating rays after having been exposed to a radiation, and a practically used one gives a stimulated emission of a wavelength in the range of 300 to 500 nm when irradiated with stimulating rays of a wavelength in the range of 400 to 900 nm. A typical example of that phosphor is a rare earth activated alkaline earth metal halide phosphor.

The radiation image storage panel has a basic structure comprising a support and a stimulable phosphor layer provided on one surface of said support. If the phosphor layer is self-supporting, the support may be omitted. The phosphor layer usually comprises a binder and stimulable phosphor particles dispersed therein, but it may consist of agglomerated phosphor without binder. The phosphor layer containing no binder can be formed by deposition process or firing process. Further, the layer comprising agglomerated phosphor soaked with a polymer is also known. In any of these phosphor layers, the stimulable phosphor produces stimulated emission when excited with a stimulating ray after having been exposed to a radiation such as X-ray. The radiation having passed through an object or radiated from an object is absorbed by the phosphor layer of the panel in proportion to the applied radiation dose, and accordingly a radiation image of the object is produced in the panel in the from of a radiation energy-stored image. The radiation energy-stored image can be released as stimulated emission by sequentially irradiating the panel with stimulating rays, and the stimulated emission is then photoelectrically detected to obtain electric signals, so as to reproduce a visible image from the obtained signals.

In general, a transparent protective film of polymer material is placed on the free surface (surface not facing the support) of the phosphor layer to keep the layer from chemical deterioration or physical damage.

The storage panel comprising the stimulable phosphor of rare earth activated alkaline earth metal halide has good sensitivity and gives an image of high sharpness, and hence that phosphor is practically advantageous. However, since the radiation image recording and reproducing method is getting more and more widely used, it is further desired to develop a stimulable phosphor having further improved characteristics.

Among the known rare earth activated alkaline earth metal halide stimulable phosphors, cerium activated phosphors are preferred because they give a rapid response. Accordingly, from a panel comprising the cerium activated phosphor, the image information can be rapidly read out.

Japanese Patent Provisional Publications No. 55-84389 and No. 7-126617 disclose a cerium activated alkaline earth metal fluorohalide stimulable phosphor which is improved by incorporating additives of a trivalent metal element (such as In) or a divalent metal element (such as Sn).

SUMMARY OF THE INVENTION

It is an object of the present invention to provide a new cerium activated alkaline earth metal fluorohalide stimulable phosphor having improved characteristics on the stimulated emission. Further, it is another object of the invention to provide a radiation image storage panel comprising said phosphor.

The present inventor studied to achieve the object, and finally found that the stimulated emission of the cerium activated phosphor containing an alkali metal element can be remarkably enhanced by incorporating a specific amount of a tetravalent metal element.

The present invention resides in a cerium activated alkaline earth metal fluorohalide phosphor having the following formula (I):

$$M^{II}FBr_{1-x}I_x:aCe,bM^I,cM^{IV}F_4 \tag{I}$$

in which $M^{II}$ is at least one alkaline earth metal element selected from the group consisting of Mg, Ca, Sr and Ba; $M^I$ is at least one alkali metal element selected from the group consisting of Li, Na, K, Rb and Cs; $M^{IV}$ is a tetravalent metal element; and x, a, b and c are numbers satisfying the conditions of $0 \leq x \leq 0.30$, $0.00001 \leq a \leq 0.01$, $0 < b \leq 0.01$ and $0 < c \leq 0.001$, respectively.

The invention also resides in a radiation image storage panel comprising the cerium activated alkaline earth metal fluorohalide phosphor.

In the present specification, each number of x, a, b and c is a value calculated from the content in each corresponding element in the starting materials. They are, hence, often slightly different from the contents of the resultant phosphor, because the composition varies in the course of the firing procedure in the preparation process of the phosphor.

Examples of $M^{IV}$ in the formula (I) include Zr, Hf, Ti, Pb and Si. Preferably, $M^{IV}$ is Zr, provided that c satisfies the condition of $0.00001 \leq c \leq 0.001$, or $M^{IV}$ is Hf, provided that c satisfies the condition of $0.00001 \leq c \leq 0.0005$. Further, $M^{IV}$ may be a combination of Zr and Hf, provided that the total value of c satisfies the condition of 0<c<0.003.

In the case where $M^{IV}$ is Zr, the numbers of x, a, b and c preferably satisfy the conditions of $0.10 \leq x \leq 0.20$, $0.0001 \leq a \leq 0.001$, $0.0001 \leq b \leq 0.001$ and $0.00005 \leq c \leq 0.001$, respectively. If $M^{IV}$ is Hf, the numbers of x, a, b and c preferably satisfy the conditions of $0.10 \leq x \leq 0.20$, $0.0001 \leq a \leq 0.001$, $0.0001 \leq b \leq 0.001$ and $0.00005 \leq c \leq 0.0005$, respectively.

BRIEF DESCRIPTION OF DRAWINGS

FIG. 2 shows a relation between the relative intensity of the stimulable emission (PSL) and the content of $HfF_4$ in the phosphor.

DETAILED DESCRIPTION OF THE INVENTION

Figure 1:
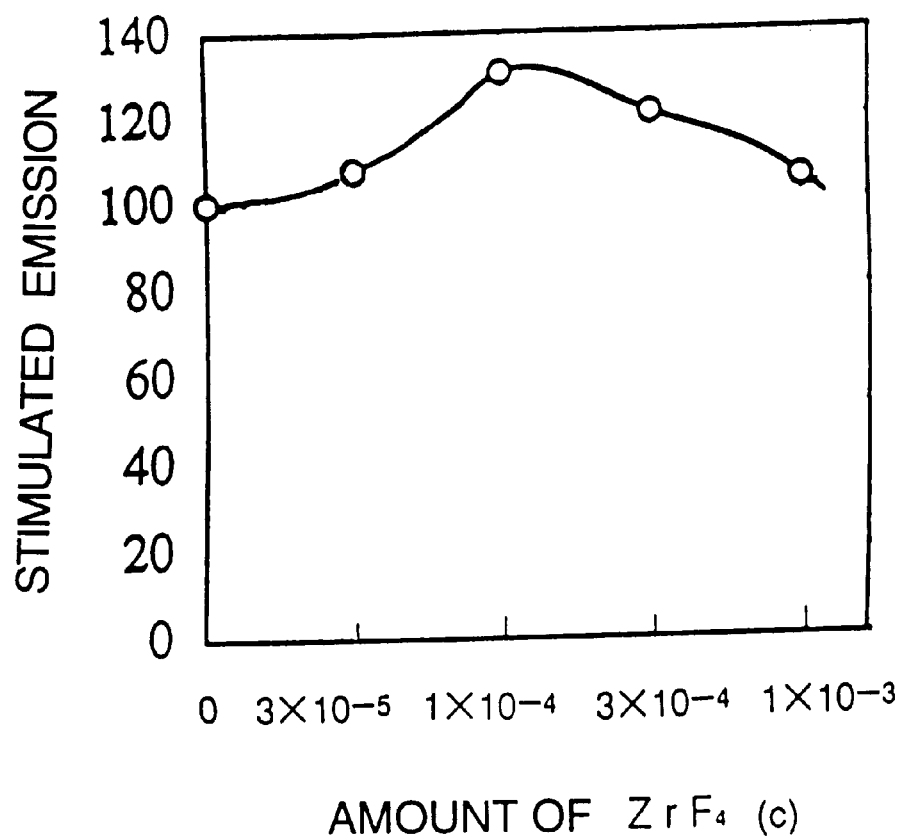
FIG. 1 shows, a relation between the relative intensity of the salable emission (PSL) and the content of $ZrF_4$ in the phosphor.

The cerium activated alkaline earth metal fluorohalide stimulable phosphor of the invention can be prepared, for example, in the following manner.

In the first place, the starting materials (i.e., alkaline earth metal halide, cerium compound such as cerium halide, alkali metal halide, and fluoride of a tetravalent metal such as Zr and Hf) are well mixed by a dry and/or wet process utilizing any of various known mixing machines. The obtained mixture is placed in a heat-resistance container such as an alumina crucible and a quartz boat, and then fired in an electric furnace. A preferred temperature for the firing ranges from 400 to 1,300° C., more preferably from 500 to 1,100° C. As the firing atmosphere, a nitrogen gas atmosphere or a nitrogen gas atmosphere containing a small amount of oxygen gas can be employed as well as atmospheric conditions. The firing period is determined upon various conditions such as the amount of the mixture charged in the container, the firing temperature and the temperature at which the product is taken out of the furnace, but generally in the range of 0.5 to 10 hours, preferably 2 to 6 hours. In order to avoid sintering, the mixture may contain fine particles of oxide (e.g., $Al_2O_3$, $SiO_2$) in an amount of 0.1 to 1.0 wt.%.

The present invention is characterized by incorporating a tetravalent metal fluoride, which is thought to make a fluorine atmosphere advantageously in the firing procedure to enhance the stimulated emission of the resultant phosphor.

The product obtained by the above firing may be further fired (i.e., second firing) in the following manner. After pulverized with a mortar, if needed, the product is again placed in the electric furnace. The second firing is then carried out at 400 to 1,300° C. under the above-mentioned atmosphere for 0.5 to 10 hours. The resultant product may be subjected to the known treatment such as washing, drying and sieving. Japanese Patent Provisional Publication No. 7-126617 describes the process for preparing phosphors in detail, and that process can be applied to the present invention.

The radiation image storage panel of the invention has a stimulable phosphor layer comprising a cerium activated alkaline earth metal fluorohalide phosphor of the formula (I). A typical stimulable phosphor layer comprises a binder resin and phosphor particles dispersed therein, and hence a radiation image storage panel having that phosphor layer is explained below. In the phosphor layer, other stimulable phosphors and/or additives such as colorant may be incorporated.

The phosphor layer can be formed, for example, in the following known manner. First, the phosphor particles are uniformly dispersed in an organic solution of binder resin to prepare a coating liquid. The ratio between the binder and the phosphor in the solution depends on the characteristics of the phosphor and the desired property of the panel, but generally they are incorporated in a ratio of 1:1 to 1:100 (binder:phosphor, by weight), preferably 1:8 to 1:40. Thus prepared coating liquid is uniformly applied on a support by known coating means (such as doctor blade, roll coater, and knife coater), and then dried to form a stimulable phosphor layer.

The support employed in the invention can be optionally selected from those employed in the conventional radiation image storage panels. On the phosphor layerside surface of the support, one or more auxiliary layers (e.g., light-reflecting layer containing light-reflecting material such as titanium dioxide, light-absorbing layer containing light-absorbing material such as carbon black, adhesive layer comprising polymer material such as gelatin) may be provided, if desired, for improving sensitivity or image quality (sharpness, graininess) or for enhancing bonding between the support and the phosphor layer. Further, for improving sharpness of the resultant radiation image, fine concaves or convexes may be formed on the phosphor layer-side surface of the support (or on the phosphor layer-side surface of the auxiliary layer, if it is provided).

On the support, a phosphor layer comprising the stimulable phosphor is provided. The thickness of the phosphor layer is designed according to the characteristics of the phosphor, the desired property of a radiation image storage panel, and the mixing ratio of binder and phosphor, but generally is in the range of 20 $\mu$m to 1 mm, preferably 50 $\mu$m to 500 $\mu$m.

The phosphor layer may be formed by other steps, for instance, applying the coating liquid onto a temporary support (e.g., glass plate, metal plate, plastic sheet), drying the applied liquid to form a phosphor sheet, peeling off the phosphor sheet, and then placing the phosphor sheet with adhesive or by pressing onto the support.

On the phosphor layer, the surface protective film is usually provided. The protective film can be formed by various methods, for example, by coating the phosphor layer with a solution containing transparent polymer material (e.g., cellulose derivative, polymethyl methacrylate) dissolved in an appropriate solvent, by fixing a beforehand prepared transparent sheet (e.g., glass plate, a film of polymer material such as polyethylene terephthalate) on the layer with adhesive, or by depositing an inorganic material film on the phosphor layer. Further, the protective film may be formed by applying a solution of an organic solvent-soluble fluorocarbon resin in which a powder of perfluoro-olefin resin or silicone resin is dispersed.

For improving the sharpness of the resultant image, one or more of the layers may be colored with a colorant which does not absorb the stimulated emission but the stimulating rays. Otherwise, an intermediate layer colored with the colorant may be provided.

Thus, the radiation image storage panel of the invention having a phosphor layer comprising a binder and a cerium activated alkaline earth metal fluorohalide phosphor of the formula (I) dispersed therein can be prepared.

The present invention is further described by the following examples.

[COMPARISON EXAMPLE 1]

Preparation of
$Ba_{0.9997}Ca_{0.0003}FBr_{0.85}I_{0.15}$:0.0003Ce,0.0006Cs

1) In 500 mL of ethanol, 0.5675 g ($1.49\times10^{-3}$ mol.) of $CeBr_3$, 0.1166 g ($1.49\times10^{-3}$ mol.) of $CaF_2$ and 0.6359 g ($2.99\times10^{-3}$ mol.) of CsBr were dissolved. The obtained solution and 1,000 g (4.23 mol.) of BaFBr were mixed and stirred for 5 minutes, and dried under vacuum at 150° C. The dried mixture was then pulverized in a mortar 2) To 400 g of the mixture (consisting of 1.69 mol. of BaFBr, $5.98\times10^{-4}$ mol. of $CeBr_3$, $5.98\times10^{-4}$ mol. of $CaF_2$, and $1.20\times10^{-3}$ mol. of CsBr), 84.63 g ($2.99\times10^{-1}$ mol.) of BaFI and 0.8567 g ($4.89\times10^{-3}$ mol.) of $BaF_2$ were added and mixed with stirring for 15 minutes. The obtained mixture was placed in a crucible, and the crucible was placed in a box container of carbon-containing material. In an electric furnace, the container was placed and fired at 930° C. for 180 minutes under atmospheric conditions. After the firing was completed, the container was taken out of the furnace and allowed to stand for cooling overnight. The cooled product was taken out from the crucible, and pulverized by a mortar and a pin-mill to prepare a granular phosphor.

3) To 30 g ($1.49\times10^{-1}$ mol.) of the granular phosphor, 0.105 g ($1.03\times10^{-3}$ mol.) of $Al_2O_3$ and 0.0217 g ($1.24\times10^{-4}$ mol.) of $BaF_2$ were added and mixed with stirring for 15 minutes by a dry process. The obtained mixture was placed in a quartz boat, and introduced into a tube under reduced pressure. The tube was placed in an electric furnace at 750° C., and allowed to stand for 3 minutes. Nitrogen gas was then introduced into the furnace to reach an atmospheric pressure. After the firing was conducted at 750° C. for 60 minutes, the gas was exhausted for 5 minutes. Nitrogen gas was again introduced into the furnace to reach the atmospheric pressure, and then the firing was continued for 100 minutes. The gas was then exhausted for 1 minute, and the tube was taken out of the furnace with continuing the exhausting. After the tube was cooled with a cooling fun, the fired product was discharged and pulverized with a mortar. Thus, the titled cerium activated barium fluorobromide phosphor was prepared.

[EXAMPLE 1]

Preparation of
$Ba_{0.9997}Ca_{0.0003}FBr_{0.85}I_{0.15}$:0.0003Ce,0.0006Cs,
$0.00003ZrF_4$ The procedure of 1) of Comparison Example 1 was repeated except for further adding 0.0250 g ($1.49\times10^{-4}$ mol.) of $ZrF_4$ to the solution, to prepare a mixture. Using thus prepared mixture, the procedure of 2) of Comparison Example 1 was repeated except for changing the amount of $BaF_2$ to 0.8360 g ($4.77\times10^{-3}$ mol.), to prepare a granular phosphor. From the granular phosphor, the titled cerium activated barium fluorobromide phosphor was prepared in the same manner as in the procedure of 3) of Comparison Example 1.

[EXAMPLE 2]

Preparation of
$Ba_{0.9997}Ca_{0.0003}FBr_{0.85}I_{0.15}$:0.0003Ce,0.0006Cs,
$0.0001ZrF_4$ The procedure of 1) of Comparison Example 1 was repeated except for further adding 0.0833 g ($4.98\times10^{-4}$ mol.) of $ZrF_4$ to the solution, to prepare a mixture. Using thus prepared mixture, the procedure of 2) of Comparison Example 1 was repeated except for changing the amount of $BaF_2$ to 0.7870 g ($4.49\times10^{-3}$ mol.), to prepare a granular phosphor. Further, the procedure of 3) of Comparison Example 1 was repeated using the obtained granular phosphor except for not adding $BaF_2$, to prepare the titled cerium activated barium fluorobromide phosphor.

[EXAMPLE 3]

Preparation of
$Ba_{0.9997}Ca_{0.0003}FBr_{0.85}I_{0.15}$:0.0003Ce,0.0006Cs,
$0.0003ZrF_4$ The procedure of 1) of Comparison Example 1 was repeated except for further adding 0.2498 g ($1.49\times10^{-3}$ mol.) of $ZrF_4$ to the solution, to prepare a mixture. Using thus prepared mixture, the procedure of 2) of Comparison Example 1 was repeated except for changing the amount of $BaF_2$ to 0.6470 g ($3.69\times10^{-3}$ mol.), to prepare a granular phosphor. Further, the procedure of 3) of Comparison Example 1 was repeated using the obtained granular phosphor except for adding 0.0184 g ($6.19\times10^{-5}$ mol.) of $BaBr_2$ in place of $BaF_2$, to prepare the titled cerium activated barium fluorobromide phosphor.

[EXAMPLE 4]

Preparation of
$Ba_{0.9997}Ca_{0.0003}FBr_{0.85}I_{0.15}$:0.0003Ce,0.0006Cs,
$0.001ZrF_4$ The procedure of 1) of Comparison Example 1 was repeated except for further adding 0.8327 g ($4.98\times10^{-3}$ mol.) of $ZrF_4$ to the solution, to prepare a mixture. Using thus prepared mixture, the procedure of 2) of Comparison Example 1 was repeated except for changing the amount of $BaF_2$ to 0.1760 g ($1.00\times10^{-3}$ mol.), to prepare a granular phosphor. From the granular phosphor, the titled cerium activated barium fluorobromide phosphor was prepared in the same manner as in the procedure of 3) of Comparison Example 1.

[Evaluation of Stimulable Phosphor]

Each stimulable phosphor prepared in Comparison Example 1 and Examples 1 to 4 was evaluated in the following manner.

Each stimulable phosphor was exposed to X-rays (80 KVp, 100 mR), and excited with He-Ne laser light (12.4 $J/m^2$). The stimulated emission emitted from the phosphor was then observed, and a relative intensity of the emission (PSL) is set forth in Table 1. The relation between PSL and the content of $ZrF_4$ is also illustrated in FIG. 1.

TABLE 1

| stimulable phosphor | | PSL |
|---|---|---|
| C. Ex. 1 | $Ba_{0.9997}Ca_{0.0003}FBr_{0.85}I_{0.15}$:0.0003Ce,0.0006Cs | 100 |
| Ex. 1 | $Ba_{0.9997}Ca_{0.0003}FBr_{0.85}I_{0.15}$:0.0003Ce,0.0006Cs, $0.00003ZrF_4$ | 105 |
| Ex. 2 | $Ba_{0.9997}Ca_{0.0003}FBr_{0.85}I_{0.15}$:0.0003Ce,0.0006Cs, $0.0001ZrF_4$ | 132 |
| Ex. 3 | $Ba_{0.9997}Ca_{0.0003}FBr_{0.85}I_{0.15}$:0.0003Ce,0.0006Cs, $0.0003ZrF_4$ | 120 |
| Ex. 4 | $Ba_{0.9997}Ca_{0.0003}FBr_{0.85}I_{0.15}$:0.0003Ce,0.0006Cs, $0.001ZrF_4$ | 105 |

The results shown in Table 1 and FIG. 1 indicate the following fact. The phosphor in which the content of $ZrF_4$ (i.e., the number c in the formula (I)) satisfies the condition of $0<c\leqq0.001$ exhibits enhanced stimulated emission. In particular, if the number c satisfies the condition of $0.00005\leqq c\leqq0.001$, the emission is remarkably enhanced.

[EXAMPLE 5]

Preparation of $Ba_{0.9997}Ca_{0.0003}FBr_{0.85}I_{0.15}:0.0003Ce,0.0006Cs, 0.0001HfF_4$ The procedure of 1) of Comparison Example 1 was repeated except for further adding 0.126,7 g ($4.98\times10^{-4}$ mol.) of $HfF_4$ to the solution, to prepare a mixture. Using thus prepared mixture, the procedure of 2) of Comparison Example 1 was repeated except for changing the amount of $BaF_2$ to 0.7870 g ($4.49\times10^{-3}$ mol.), to prepare a granular phosphor. Further, the procedure of 3) of Comparison Example 1 was repeated using the obtained granular phosphor except for adding no $BaF_2$, to prepare the titled cerium activated barium fluorobromide phosphor.

[EXAMPLE 6]

Preparation of $Ba_{0.9997}Ca_{0.0003}FBr_{0.85}I_{0.15}:0.0003Ce,0.0006Cs, 0.0003HfF_4$ The procedure of 1) of Comparison Example 1 was repeated except for further adding 0.3792 g ($1.49\times10^{-3}$ mol.) of $HfF_4$ to the solution, to prepare a mixture. Using thus prepared mixture, the procedure of 2) of Comparison Example 1 was repeated except for changing the amount of $BaF_2$ to 0.6470 g ($3.69\times10^{-3}$ mol.), to prepare a granular phosphor. Further, the procedure of 3) of Comparison Example 1 was repeated using the obtained granular phosphor except for adding 0.0184 g ($6.19\times10^{-5}$ mol.) of $BaBr_2$ in place of $BaF_2$, to prepare the titled cerium activated barium fluorobromide phosphor.

[EXAMPLE 7]

Preparation of $Ba_{0.9997}Ca_{0.0003}FBr_{0.85}I_{0.15}:0.0003Ce,0.0006Cs, 0.0005HfF_4$ The procedure of 1) of Comparison Example 1 was repeated except for further adding 0.6335 g ($2.49\times10^{-3}$ mol.) of $HfF_4$ into the solution, to prepare a mixture. Using thus prepared mixture, the procedure of 2) of Comparison Example 1 was repeated except for changing the amount of $BaF2$ to 0.1760 g ($1.00\times10^{-3}$ mol.), to prepare a granular phosphor. From the granular phosphor, the titled cerium activated barium fluorobromide phosphor was prepared in the same manner as in the procedure of 3) of Comparison Example 1.

[COMPARISON EXAMPLE 2]

Preparation of $BaFBr_{0.85}I_{0.15}:0.0003Ce,0.0006Cs$

1) In 500 mL of ethanol, 0.5675 g ($1.49\times10^{-3}$ mol.) of $CeBr_3$ and 0.6359 g ($2.99\times10^{-3}$ mol.) of CsBr were dissolved. The obtained solution and 1,000 g (4.23 mol.) of BaFBr were mixed and stirred for 5 minutes, and then dried under vacuum at 150° C. The dried mixture was pulverized in a mortar 2) To 20 g of the mixture (consisting of $8.47\times10^{-2}$ mol. of BaFBr, $2.54\times10^{-5}$ mol. of $CeBr_3$ and $5.08\times10^{-5}$ mol. of CsBr), 4.23 g ($1.49\times10^{-2}$ mol.) of BaFI and 0.0131 g ($7.47\times10^{-5}$ mol.) of $BaF_2$ were added and mixed by a dry process with stirring for 15 minutes. The obtained mixture was charged in a crucible, and the crucible was placed in a box container made of carbon-containing material. In an electric furnace, the container was placed and fired at 930° C. for 180 minutes under atmospheric conditions. After the firing was completed, the container was taken out of the furnace and allowed to stand for cooling overnight. The cooled product was taken out from the crucible, and pulverized in a mortar to prepare the titled cerium activated barium fluorobromide phosphor.

[EXAMPLE 8]

Preparation of $BaFBr_{0.85}I_{0.15}:0.0003Ce,0.0006Cs, 0.0003ZrF_4$

The procedure of 2) of Comparison Example 2 was repeated except for changing the amount of $BaF_2$ to 0.0376 g ($2.14\times10^{-4}$ mol.) and for further adding 0.0050 g ($2.99\times10^{-5}$ mol.) of $ZrF_4$, to prepare the titled cerium activated barium fluorobromide phosphor.

[COMPARISON EXAMPLE 3]

Preparation of $Ba_{0.9997}Ca_{0.0003}FBr:0.0003Ce, 0.0006Cs$

1) In 500 mL of ethanol, 0.5675 g ($1.49\times10^{-3}$ mol.) of $CeBr_3$, 0.1166 g ($1.49\times10^{-3}$ mol.) of $CaF_2$ and 0.6359 g ($2.99\times10^{-3}$ mol.) of CsBr were dissolved. The obtained solution and 1,000 g (4.23 mol.) of BaFBr were mixed and stirred for 5 minutes, and then dried under vacuum at 150° C. The dried mixture was pulverized in a mortar.

2) To 20 g of the mixture (consisting of 0.085 mol. of BaFBr, $2.98\times10^{-5}$ mol. of $CeBr_3$, $2.98\times10^{-5}$ mol. of $CaF_2$ and $5.96\times10^{-5}$ mol. of CsBr), 0.0513 g ($2.92\times10^{-4}$ mol.) of $BaF_2$ was added and mixed by a dry process with stirring for 15 minutes. The mixture was charged into a crucible, and the crucible was further placed in a box container made of carbon-containing material. In an electric furnace, the container was placed and fired at 930° C. for 180 minutes under atmospheric conditions. After the firing was completed, the container was taken out of the furnace and allowed to stand for cooling over night. The cooled product was taken out of the crucible, and pulverized with a mortar to prepare the titled cerium activated barium fluorobromide phosphor.

[EXAMPLE 9]

Preparation of $Ba_{0.9997}Ca_{0.0003}FBr:0.0003Ce, 0.0006Cs, 0.0003\ ZrF_4$

The procedure of 1) of Comparison Example 3 was repeated except for further adding 0.0054 g ($3.22\times10^{-5}$ mol.) of $ZrF_4$ to the solution, to prepare the titled cerium activated barium fluorobromide phosphor.

[COMPARISON EXAMPLE 4]

Preparation of $Sr_{0.9997}Ca_{0.0003}FBr:0.0003Ce, 0.0006Cs$ 20 g ($1.07\times10^{-1}$ mol.) of SrFBr, 0.0123 g ($3.25\times10^{-5}$ mol.) of $CeBr_3$, 0.0025 g ($3.25\times10^{-5}$ mol.) of $CaF^2$, 0.0137 g ($6.43\times10^{-5}$ mol.) of CsBr and 0.0330 g ($2.63\times10^{-4}$ mol.) of $SrF_2$ were mixed by a dry process with stirring for 15 minutes. The mixture was charged into a crucible, and the crucible was further placed in a box container made of carbon-containing material. In an electric furnace, the container was placed and fired at 930° C. for 180 minutes under atmospheric conditions. After the firing was completed, the container was taken out of the furnace and allowed to stand for cooling overnight. The cooled product was taken out of the crucible, and pulverized in a mortar to prepare the titled cerium activated strontium fluorobromide phosphor.

[EXAMPLE 10]

Preparation of $Sr_{0.9997}Ca_{0.0003}FBr:0.0003Ce,$
$0.0006Cs, 0.0003\ ZrF_4$

The procedure of Comparison Example 4 was repeated except for changing the amount of $SrF_2$ to 0.0081 g (6.43× $10^{-5}$ mol.) and for further adding 0.0054 g (3.22×$10^{-5}$ mol.) of $ZrF_4$, to prepare the titled cerium activated strontium fluorobromide phosphor.

[Evaluation of Stimulable Phosphor]

Each stimulable phosphor prepared above was evaluated in the following manner.

Each stimulable phosphor was exposed to X-rays (80 KVp, 100 mR), and excited with He-Ne laser light (12.4 J/m$^2$). The stimulated emission emitted from the phosphor was then observed, and a relative intensity of the emission (PSL) is set forth in Table 2. The relation between PSL and the content of $HfF_4$ is also illustrated in FIG. 2.

TABLE 2

| stimulable phosphor | | PSL |
|---|---|---|
| C. Ex. 1 | $Ba_{0.9997}Ca_{0.0003}FBr_{0.85}I_{0.15}:0.0003Ce,0.0006Cs$ | 100 |
| Ex. 5 | $Ba_{0.9997}Ca_{0.0003}FBr_{0.85}I_{0.15}:0.0003Ce,0.0006Cs, 0.0001HfF_4$ | 106 |
| Ex. 6 | $Ba_{0.9997}Ca_{0.0003}FBr_{0.85}I_{0.15}:0.0003Ce,0.0006Cs, 0.0003HfF_4$ | 125 |
| Ex. 7 | $Ba_{0.9997}Ca_{0.0003}FBr_{0.85}I_{0.15}:0.0003Ce,0.0006Cs, 0.0005ZrF_4$ | 102 |
| C. Ex. 2 | $BaFBr_{0.85}I_{0.15}:0.0003Ce,0.0006Cs$ | 100 |
| Ex. 8 | $BaFBr_{0.85}I_{0.15}:0.0003Ce,0.0006Cs,0.0003ZrF_4$ | 931 |
| C. Ex. 3 | $Ba_{0.9997}Ca_{0.0003}FBr:0.0003Ce,0.0006Cs$ | 100 |
| Ex. 9 | $Ba_{0.9997}Ca_{0.0003}FBr:0.0003Ce,0.0006Cs,0.0003ZrF_4$ | 161 |
| C. Ex. 4 | $Sr_{0.9997}Ca_{0.0003}FBr:0.0003Ce,0.0006Cs$ | 100 |
| Ex. 10 | $Sr_{0.9997}Ca_{0.0003}FBr:0.0003Ce,0.0006Cs,0.0003ZrF_4$ | 144 |

The results shown in Table 2 and FIG. 2 indicate that the cerium activated alkaline earth metal fluorohalide stimulable phosphors of the invention containing $HfF_4$ or $ZrF_4$ (i.e., Examples 5 to 10) exhibit enhanced stimulated emission, as compared with the conventional stimulable phosphors (i.e., Comparison Examples 1 to 4).

[EXAMPLE 11]

Preparation of Radiation Image Storage Panel 358 g of the cerium activated alkaline earth metal fluorohalide stimulable phosphor containing $HfF_4$ or $ZrF_4$, 15.8 g of polyurethane resin (Desmorac 4125 [trade name], available from Sumitomo Bayer Urethan Co., Ltd.) and 2.0 g of bisphenol A epoxy resin were added to a mixed solvent of methyl ethyl ketone and toluene (1:1), and mixed by a propeller mixer to prepare a coating liquid having a viscosity of 25 to 30 PS. The prepared coating liquid was applied onto a polyethylene terephthalate film (support) provided with a subbing layer by a doctor blade, and dried at 100° C. for 15 minutes to form a stimulable phosphor layer of 200 μm thick on the support.

Independently, 70 g of fluorocarbon resin (copolymer of fluoro-olefin and monovinyl ether, Lumiflon LF504X [trade name], available from Asahi Glass Co., Ltd.), 25 g of isocyanate (crosslinking agent, Desmodule Z4370 [trade name], available from Sumitomo Bayer Urethan Co., Ltd.), 5 g of bisphenol A epoxy resin, and 10 g of silicone resin powder (KMP-590 [trade name], available from The Shin-Etsu Chemical Co., Ltd.; grain size: 1 to 2 μm) were incorporated in a mixed solvent of toluene and isopropyl alcohol (1:1) to prepare a coating liquid. The coating liquid was then applied onto the phosphor layer by means of a doctor blade, and heated for curing and drying at 120° C. for 30 minutes, to form a surface protective film (thickness: 10 μm) on the phosphor layer.

Thus, the radiation image storage panel of the invention was produced.

What is claimed is:

1. A cerium activated alkaline earth metal fluorohalide phosphor having the following formula (I):

$$M^{II}FBr_{1-x}I_x:aCe,bM^I,cM^{IV}F_4 \qquad (I)$$

in which $M^{II}$ is at least one alkaline earth metal element selected from the group consisting of Mg, Ca, Sr and Ba; $M^I$ is at least one alkali metal element selected from the group consisting of Li, Na, K, Rb and Cs; $M^{IV}$ is a tetravalent metal element; and x, a, b and c are numbers satisfying the conditions of $0 \leq x \leq 0.30$, $0.00001 \leq a \leq 0.01$, $0 < b \leq 0.01$ and $0 < c \leq 0.001$, respectively.

2. The cerium activated alkaline earth metal fluorohalide phosphor of claim 1, wherein $M^{IV}$ is Zr and c is a number satisfying the condition of $0.00001 \leq c \leq 0.001$.

3. The cerium activated alkaline earth metal fluorohalide phosphor of claim 1, wherein $M^{IV}$ is Hf and c is a number satisfying the condition of $0.0000 \leq c \leq 0.0005$.

4. The cerium activated alkaline earth metal fluorohalide phosphor of claim 1, wherein $M^{IV}$ represents Zr, and x, a, b and c are numbers satisfying the conditions of $0.10 \leq x \leq 0.20$, $0.0001 \leq a \leq 0.001$, $0.0001 \leq b \leq 0.001$ and $0.00005 \leq c \leq 0.001$, respectively.

5. The cerium activated alkaline earth metal fluorohalide phosphor of claim 1, wherein $M^{IV}$ represents Hf, and x, a, b and c are numbers satisfying the conditions of $0.10 \leq x \leq 0.20$, $0.0001 \leq a \leq 0.001$, $0.0001 \leq b \leq 0.001$ and $0.00005 \leq c \leq 0.0005$, respectively.

6. A radiation image storage panel comprising a cerium activated alkaline earth metal fluorohalide phosphor of claim 1.

* * * * *